(12) United States Patent
Choi

(10) Patent No.: US 11,887,588 B2
(45) Date of Patent: Jan. 30, 2024

(54) DISPLAY DEVICE

(71) Applicant: LG ELECTRONICS INC., Seoul (KR)

(72) Inventor: Woojin Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 275 days.

(21) Appl. No.: 17/417,462

(22) PCT Filed: Jun. 20, 2019

(86) PCT No.: PCT/KR2019/007420
§ 371 (c)(1),
(2) Date: Jun. 23, 2021

(87) PCT Pub. No.: WO2020/256184
PCT Pub. Date: Dec. 24, 2020

(65) Prior Publication Data
US 2022/0059089 A1    Feb. 24, 2022

(51) Int. Cl.
| | | |
|---|---|---|
| *G10L 15/20* | (2006.01) | |
| *G10L 15/22* | (2006.01) | |
| *G10L 21/0264* | (2013.01) | |
| *G10L 25/06* | (2013.01) | |
| *H04R 3/04* | (2006.01) | |
| *H04R 29/00* | (2006.01) | |

(52) U.S. Cl.
CPC .............. *G10L 15/20* (2013.01); *G10L 15/22* (2013.01); *G10L 21/0264* (2013.01); *G10L 25/06* (2013.01); *H04R 3/04* (2013.01); *H04R 29/001* (2013.01); *G10L 2015/223* (2013.01)

(58) Field of Classification Search
CPC ..... G10L 15/20; G10L 15/22; G10L 21/0264; G10L 25/06; G10L 25/84; G10L 2015/223; G06F 3/165; H04R 3/04; H04R 29/001
See application file for complete search history.

(56) References Cited

U.S. PATENT DOCUMENTS

| | | | |
|---|---|---|---|
| 6,266,422 B1 * | 7/2001 | Ikeda | G10L 21/0208 |
| | | | 381/94.1 |
| 9,640,179 B1 * | 5/2017 | Hart | G10L 21/0208 |
| 9,691,378 B1 * | 6/2017 | Meyers | G10L 21/028 |
| 9,794,710 B1 * | 10/2017 | Sheen | G06F 3/165 |
| 11,621,014 B2 * | 4/2023 | Zhou | G10L 25/81 |
| | | | 704/233 |

(Continued)

FOREIGN PATENT DOCUMENTS

| | | | | |
|---|---|---|---|---|
| EP | 3382949 A1 * | 10/2018 | ........... | G06F 1/3228 |
| EP | 3644315 A1 * | 4/2020 | ......... | G10L 21/0232 |

(Continued)

*Primary Examiner* — Mohammad K Islam
(74) *Attorney, Agent, or Firm* — Birch, Stewart, Kolasch & Birch, LLP

(57) ABSTRACT

A display device including an external device interface configured to connect the display device to an external speaker; a microphone configured to receive a microphone signal; and a controller configured to: transmit an inaudible test signal to the external speaker to measure a signal delay between the external speaker and the display device, and extract a voice signal by removing an acoustic signal output from the external speaker from the microphone signal based on the measured signal delay.

17 Claims, 9 Drawing Sheets

(56) References Cited

U.S. PATENT DOCUMENTS

| | | | | |
|---|---|---|---|---|
| 2004/0143433 | A1* | 7/2004 | Marumoto | H03G 3/32 704/E21.009 |
| 2008/0247557 | A1* | 10/2008 | Sudo | H04M 9/082 381/66 |
| 2011/0071821 | A1* | 3/2011 | Konchitsky | H04R 3/005 704/226 |
| 2016/0036962 | A1* | 2/2016 | Rand | H04M 1/656 455/418 |
| 2016/0098989 | A1* | 4/2016 | Layton | G10L 15/20 704/231 |
| 2017/0235543 | A1* | 8/2017 | England | G10L 19/0017 700/94 |
| 2018/0096678 | A1* | 4/2018 | Zhou | G10L 15/32 |
| 2018/0165055 | A1* | 6/2018 | Yu | H04L 65/60 |
| 2018/0285065 | A1* | 10/2018 | Jeong | G06F 3/167 |
| 2019/0043498 | A1 | 2/2019 | Pillai et al. | |
| 2019/0096408 | A1* | 3/2019 | Li | G10L 17/06 |
| 2019/0096429 | A1* | 3/2019 | Kovvali | G10L 21/0208 |
| 2020/0045166 | A1* | 2/2020 | Furuta | H04M 3/002 |
| 2020/0074995 | A1* | 3/2020 | Rosenberg | G10L 15/20 |
| 2020/0091959 | A1* | 3/2020 | Curtis | H04B 1/7073 |
| 2020/0135224 | A1* | 4/2020 | Bromand | H04S 7/305 |
| 2020/0143800 | A1* | 5/2020 | Zhou | G10L 15/20 |
| 2020/0357374 | A1* | 11/2020 | Verweij | G10K 11/17873 |
| 2020/0367006 | A1* | 11/2020 | Beckhardt | H04S 3/008 |
| 2020/0374269 | A1* | 11/2020 | Lidman | H04L 63/10 |
| 2020/0402490 | A1* | 12/2020 | Duthaler | H04R 1/406 |
| 2021/0343278 | A1* | 11/2021 | Bromand | G10L 25/84 |

FOREIGN PATENT DOCUMENTS

| | | |
|---|---|---|
| JP | 2010-62774 A | 3/2010 |
| KR | 10-2013-0087678 A | 8/2013 |
| KR | 10-2016-0147556 A | 12/2016 |
| KR | 10-2017-0009650 A | 1/2017 |

* cited by examiner

| Vol | Ref | Mic | Ext |
|---|---|---|---|
| 10 | -7 | -30 | -26 |
| 20 | -14 | -32 | -28 |
| 30 | -33 | -40 | -38 |
| ... | ... | ... | ... |

DISPLAY DEVICE

CROSS-REFERENCE TO RELATED APPLICATION

This Application is the National Phase of PCT International Application No. PCT/KR2019/007420 filed on Jun. 20, 2019, which is hereby expressly incorporated by reference into the present application.

BACKGROUND OF THE INVENTION

Field of the Invention

The present disclosure relates to a display device, and more particularly, to a display device that removes an acoustic signal output from an external speaker in order to recognize a user's voice.

Discussion of the Related Art

Recently, a digital TV service using a wired or wireless communication network has come into wide use. The digital TV service may provide various services which cannot be provided by an existing analog broadcast service.

For example, an Internet protocol television (IPTV) service or a smart TV service which is a digital TV service provides interactivity for enabling a user to actively select a type of a program to be viewed, a viewing time, etc. The IPTV service or the smart TV service may provide various additional services, e.g., Internet search, home shopping, online games, etc. based on such interactivity.

In particular, digital TVs provide video on demand (VOD), and accordingly, the cases of users watching movies and the like using a display device have increased. When users watch movies, music broadcasts or the like, the desire to output high-quality sound and feel various stereoscopic sound effects has gradually increased, and the users who connect sound bars to display devices are increasing.

However, when the user's voice is recognized while an external speaker such as a sound bar is connected to the display device, since the user's voice is mixed with the acoustic signal output from the external speaker, it is difficult to recognize the user's voice.

Specifically, since the acoustic signal output from the external speaker is input together with the user's voice when receiving a user's voice from a microphone installed on the display device, the acoustic signal output from the external speaker needs to be removed to more accurately recognize the user's voice. However, there is a problem in that it is difficult to remove the acoustic signal of the external speaker because the installation position of the external speaker is not fixed for each display device and the output magnitude is different for each external speaker.

SUMMARY OF THE INVENTION

An object of the present disclosure is to provide a display device capable of recognizing a user's voice even from a distance regardless of whether an external speaker is connected or an installation condition of the external speaker.

An object of the present disclosure is to provide a display device capable of measuring a delay required until an acoustic signal output from an external speaker is input to the display device without disturbing the user's viewing of content.

An object of present disclosure is to provide a display device capable of recognizing a user's voice by removing an acoustic signal output from a speaker from a microphone signal using a measured delay.

An object of present disclosure is to provide a display device capable of removing an acoustic signal output from an external speaker irrespective of the output characteristics of each external speaker.

According to an embodiment of the present disclosure, a display device includes an external device interface connected to an external speaker, a voice acquisition module configured to receive a microphone signal, and a controller configured to acquire a voice signal by removing an acoustic signal output from the external speaker from the microphone signal based on a delay of a sound output from the external speaker until the sound is received by the voice acquisition module.

The controller may acquire the delay using a noise other than an audible frequency.

The controller may allow the noise other than the audible frequency to be output from the external speaker, and acquire the delay by recognizing the noise other than the audible frequency from the microphone signal.

The controller may acquire a delay related to the external speaker using the noise other than the audible frequency when a volume is set to zero.

The controller may acquire a delay related to the external speaker using the noise other than the audible frequency when content is being played.

The controller may transmit an audio signal acquired by mixing a sound of the content and the noise other than the audible frequency to the external speaker, and acquire the delay by extracting the noise other than the audible frequency from the microphone signal using a band pass filter when the content is being played.

The controller may acquire the delay by applying the extracted noise other than the audible frequency and the audio signal to a cross correlation function.

The controller may transmit an audio signal for outputting the sound of the content alone to the external speaker when acquiring the delay.

The controller may acquire the delay at least one of a time point of connection detection of the external speaker, a power on/off time point, a channel change time point, and an external input switch time point.

The controller may obtain the delay by using noise including an audible frequency at a time point when the external speaker is first connected thereto.

The display device may further include an audio output interface configured to output sound, and the controller may acquire the voice signal by removing an acoustic signal output from at least one of the audio output interface or the external speaker from a microphone signal received by the voice acquisition module.

The controller may include a reference sound capture module configured to acquire audio signals to be respectively output from the external speaker and the audio output interface, a delay measurement module configured to calculate the delay by comparing the microphone signal with an audio signal input to the external speaker, a preprocessor configured to acquire a voice signal by removing the audio signals from the microphone signal based on the delay, and a voice recognition engine configured to acquire the voice signal.

The audio signal may include the noise other than the audible frequency.

The display device may further include an audio output interface configured to output a sound and a storage configured to store a gain table in which a volume level, a first magnitude of the microphone signal when a sound output from the audio output interface is input to the voice acquisition module at the volume level, and a second magnitude of the microphone signal when a sound output at the volume level in a state where the external speaker is connected is input to the voice acquisition module are mapped to one another.

The controller may correct the microphone signal based on a difference between the first magnitude and the second magnitude before removing the acoustic signal from the microphone signal.

The storage is configured to map and store the first magnitude and the second magnitude for each volume level, when storing the gain table.

Advantageous Effects

According to an embodiment of the present disclosure, since a noise other than an audible frequency is used, there is an advantage of measuring a delay without disturbing the user's viewing of content.

In addition, there is an advantage in that the acoustic signal of the external speaker can be removed from the microphone signal to the maximum by using the measured delay.

In addition, there is an advantage in that the problem that the effect of removing the acoustic signal of the external speaker decreases in the process of using the display device is minimized to ensure the recognition accuracy of the user's voice and increase the reliability by performing re-measurement of the delay at each time the delay may be changed.

In addition, since the gain table is used to correct the gain when removing the acoustic signal of the external speaker, it is possible to remove the acoustic signal of the external speaker from the microphone signal, regardless of the different output characteristics for each type of external speaker.

DETAILED DESCRIPTION OF THE EMBODIMENTS

Hereinafter, embodiments relating to the present disclosure will be described in detail with reference to the accompanying drawings. The suffixes "module" and "interface" for components used in the description below are assigned or mixed in consideration of easiness in writing the specification and do not have distinctive meanings or roles by themselves.

Figure 1:
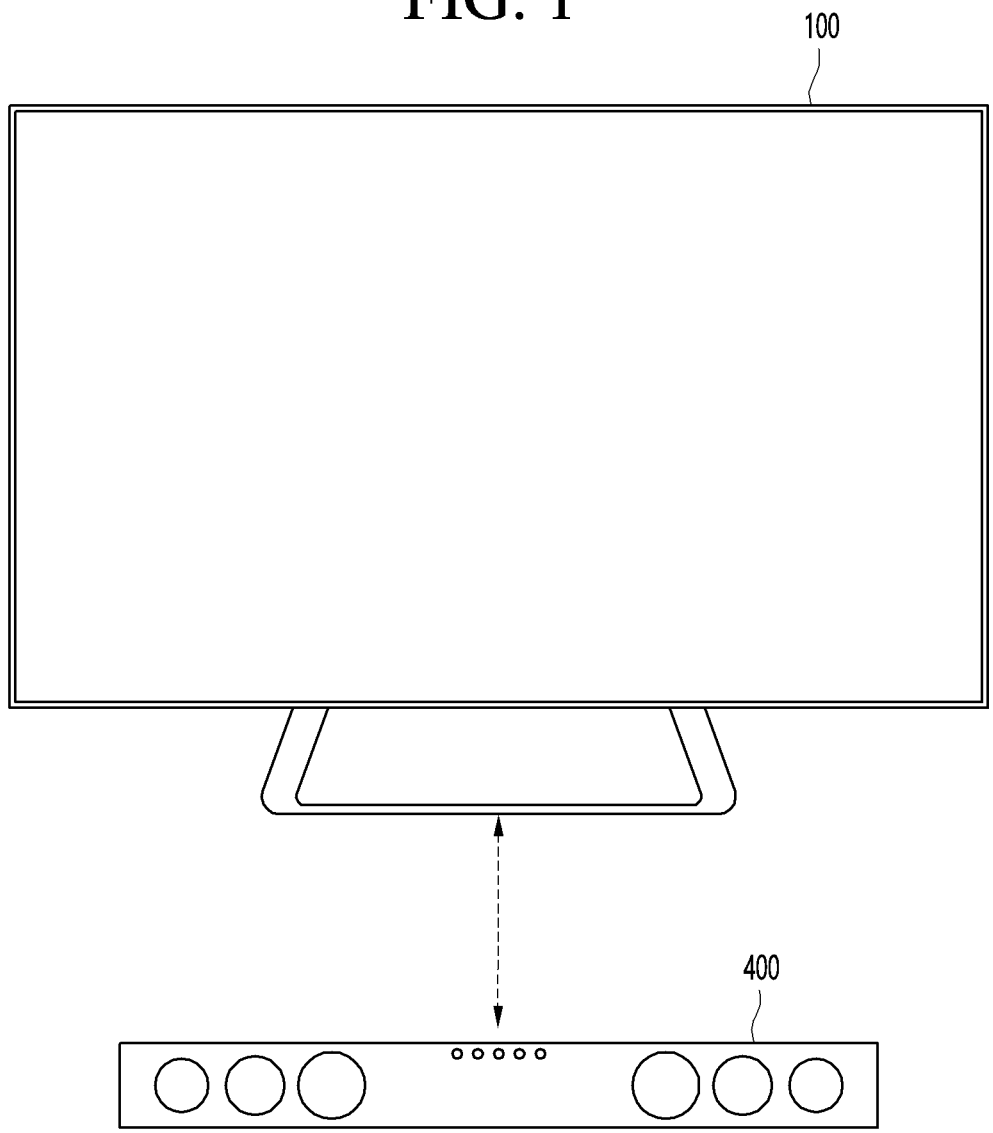
FIG. 1 is a diagram illustrating a display system according to an embodiment of the present disclosure.

FIG. 1 is a diagram illustrating a display system according to an embodiment of the present disclosure.

Referring to FIG. 1, a display system may include a display device 100 and an external speaker 400, and the external speaker 400 may be connected to the display device 100 in a wired manner or a wireless manner.

Figure 2:
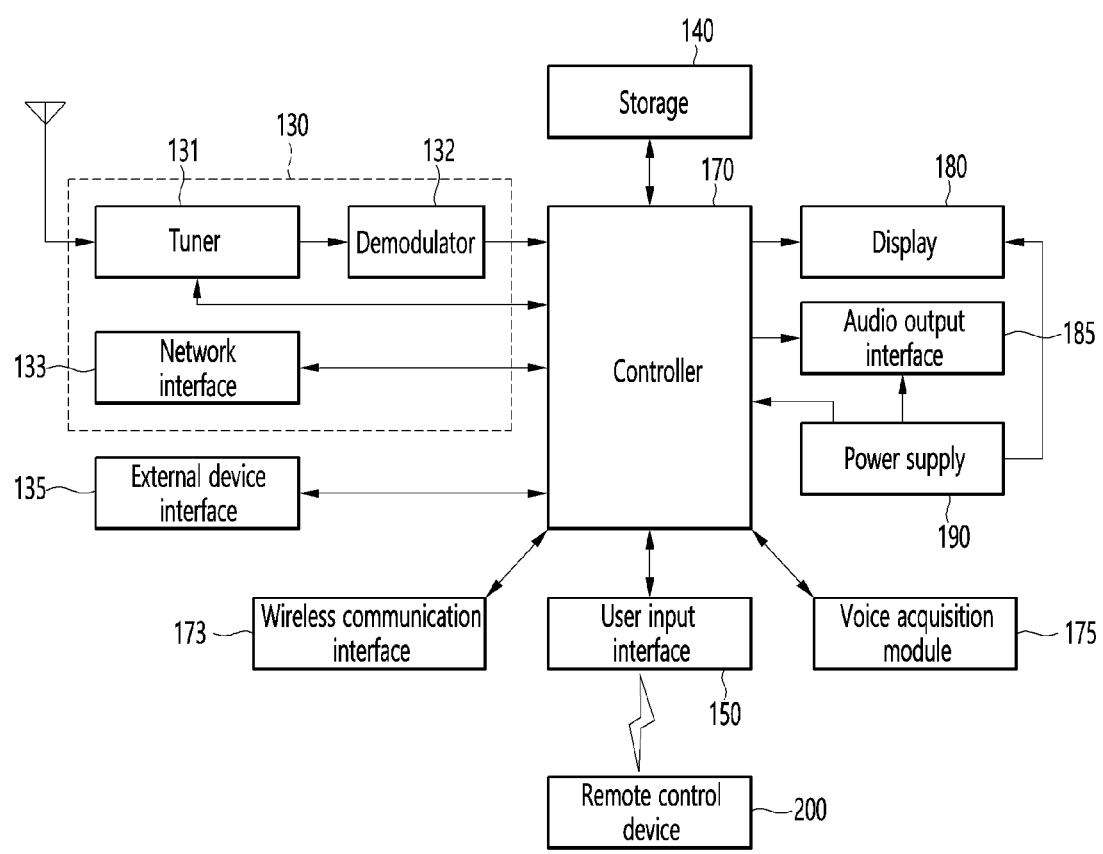
FIG. 2 is a block diagram illustrating a configuration of a display device according to an embodiment of the present disclosure.

The display device 100 may be connected to at least one external speaker through an external device interface 135 (FIG. 2).

For example, the external speaker 400 may be a sound bar, a speaker, or the like, but is only exemplary.

The display system may be a home theater system including the display device 100 and the external speaker 400, for example, a sound bar and/or a plurality of speakers.

The display device 100 may be various electronic devices including display means. For example, the display device 100 may include a TV, a monitor, a computer, a tablet PC, and a portable terminal capable of displaying broadcasts.

The display device 100 may receive a voice signal, and may perform voice recognition on a voice signal received through an embedded voice recognition engine (not shown) provided therein.

Meanwhile, the display device 100 may include a voice database for storing data used for voice recognition in the voice recognition engine or in a storage outside the voice recognition engine.

The voice database may store an acoustic model and a language model, and may include an acoustic model database and a language model database storing the acoustic model and the language model, respectively.

The voice database may further include a pronunciation dictionary database storing vocabulary and corresponding phonetic symbols. In some embodiments, the voice recognition engine may further include a phonetic symbol generating module for generating phonetic symbols from received text data.

The voice recognition engine may process the received voice signal and output voice recognition result data by comparing the voice signal with data stored in the voice database. Meanwhile, the display device 100 may perform various operations, such as menu selection, text input, command input, and channel switching, based on the output voice recognition result data.

FIG. 2 is a block diagram illustrating a configuration of a display device according to an embodiment of the present disclosure.

Referring to FIG. 2, a display device 100 can include a broadcast reception module 130, an external device interface 135, a storage 140, a user input interface 150, a controller 170, a wireless communication interface 173, a voice acquisition module 175, a display 180, an audio output interface 185, and a power supply 190.

The broadcast reception module 130 can include a tuner 131, a demodulator 132, and a network interface 133.

The tuner 131 can select a specific broadcast channel according to a channel selection command. The tuner 131 can receive broadcast signals for the selected specific broadcast channel.

The demodulator 132 can divide the received broadcast signals into video signals, audio signals, and broadcast program related data signals and restore the divided video signals, audio signals, and data signals to an output available form.

The network interface 133 can provide an interface for connecting the display device 100 to a wired/wireless network including internet network. The network interface 133 can transmit or receive data to or from another user or another electronic device through an accessed network or another network linked to the accessed network.

The network interface 133 can access a predetermined webpage through an accessed network or another network linked to the accessed network. That is, it can transmit or receive data to or from a corresponding server by accessing a predetermined webpage through network.

Then, the network interface 133 can receive contents or data provided from a content provider or a network operator. That is, the network interface 133 can receive contents such as movies, advertisements, games, VODs, and broadcast signals, which are provided from a content provider or a network provider, through network and information relating thereto.

Additionally, the network interface 133 can receive firmware update information and update files provided from a network operator and transmit data to an internet or content provider or a network operator.

The network interface 133 can select and receive a desired application among applications open to the air, through network.

The external device interface 135 can receive an application or an application list in an adjacent external device and deliver it to the controller 170 or the storage 140.

The external device interface 135 can provide a connection path between the display device 100 and an external device. The external device interface 135 can receive at least one of image and audio outputted from an external device that is wirelessly or wiredly connected to the display device 100 and deliver it to the controller. The external device interface 135 can include a plurality of external input terminals. The plurality of external input terminals can include an RGB terminal, at least one High Definition Multimedia Interface (HDMI) terminal, and a component terminal.

An image signal of an external device inputted through the external device interface 135 can be outputted through the display 180. A sound signal of an external device inputted through the external device interface 135 can be outputted through the audio output interface 185.

An external device connectable to the external device interface 135 can be one of a set-top box, a Blu-ray player, a DVD player, a game console, a sound bar, a smartphone, a PC, a USB Memory, and a home theater system but this is just exemplary.

Additionally, some content data stored in the display device 100 can be transmitted to a user or an electronic device, which is selected from other users or other electronic devices pre-registered in the display device 100.

The storage 140 can store signal-processed image, voice, or data signals stored by a program in order for each signal processing and control in the controller 170.

Additionally, the storage 140 can perform a function for temporarily store image, voice, or data signals outputted from the external device interface 135 or the network interface 133 and can store information on a predetermined image through a channel memory function.

The storage 140 can store an application or an application list inputted from the external device interface 135 or the network interface 133.

The display device 100 can play content files (for example, video files, still image files, music files, document files, application files, and so on) stored in the storage 140 and provide them to a user.

The user input interface 150 can deliver signals inputted from a user to the controller 170 or deliver signals from the controller 170 to a user. For example, the user input interface 150 can receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR.

Additionally, the user input interface 150 can deliver, to the controller 170, control signals inputted from local keys (not shown) such as a power key, a channel key, a volume key, and a setting key.

Image signals that are image-processed in the controller 170 can be inputted to the display 180 and displayed as an image corresponding to corresponding image signals. Additionally, image signals that are image-processed in the controller 170 can be inputted to an external output device through the external device interface 135.

Voice signals processed in the controller 170 can be outputted to the audio output interface 185. Additionally, voice signals processed in the controller 170 can be inputted to an external output device through the external device interface 135.

Besides that, the controller 170 can control overall operations in the display device 100.

Additionally, the controller 170 can control the display device 100 by a user command or internal program inputted through the user input interface 150 and download a desired application or application list into the display device 100 in access to network.

The controller 170 can output channel information selected by a user together with processed image or voice signals through the display 180 or the audio output interface 185.

Additionally, according to an external device image playback command received through the user input interface 150, the controller 170 can output image signals or voice signals of an external device such as a camera or a camcorder, which are inputted through the external device interface 135, through the display 180 or the audio output interface 185.

Moreover, the controller 170 can control the display 180 to display images and control broadcast images inputted through the tuner 131, external input images inputted through the external device interface 135, images inputted through the network interface, or images stored in the storage 140 to be displayed on the display 180. In this case, an image displayed on the display 180 can be a still image or video and also can be a 2D image or a 3D image.

Additionally, the controller 170 can play content stored in the display device 100, received broadcast content, and external input content inputted from the outside, and the content can be in various formats such as broadcast images, external input images, audio files, still images, accessed web screens, and document files.

Moreover, the wireless communication interface 173 can perform a wired or wireless communication with an external electronic device. The wireless communication interface 173 can perform short-range communication with an external device. For this, the wireless communication interface 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication interface 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication interface 173 can detect (or recognize) a communicable wearable device around the display device 100. Furthermore, if the detected wearable device is a device authenticated to communicate with the display device 100, the controller 170 can transmit at least part of data processed in the display device 100 to the wearable device through the wireless communication interface 173. Accordingly, a user of the wearable device can use the data processed in the display device 100 through the wearable device.

The voice acquisition module 175 can acquire audio. The voice acquisition module 175 may include at least one microphone (not shown), and can acquire audio around the display device 100 through the microphone (not shown).

The display 180 can convert image signals, data signals, or OSD signals, which are processed in the controller 170, or images signals or data signals, which are received in the external device interface 135, into R, G, and B signals to generate driving signals.

Furthermore, the display device 100 shown in FIG. 2 is just one embodiment of the present disclosure and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 2, the display device 100 can receive images through the network interface 133 or the external device interface 135 and play them without including the tuner 131 and the demodulator 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present disclosure described below can be performed by one of the display device described with reference to FIG. 2, an image processing device such as the separated set-top box, and a content playback device including the display 180 and the audio output interface 185.

Figure 3:
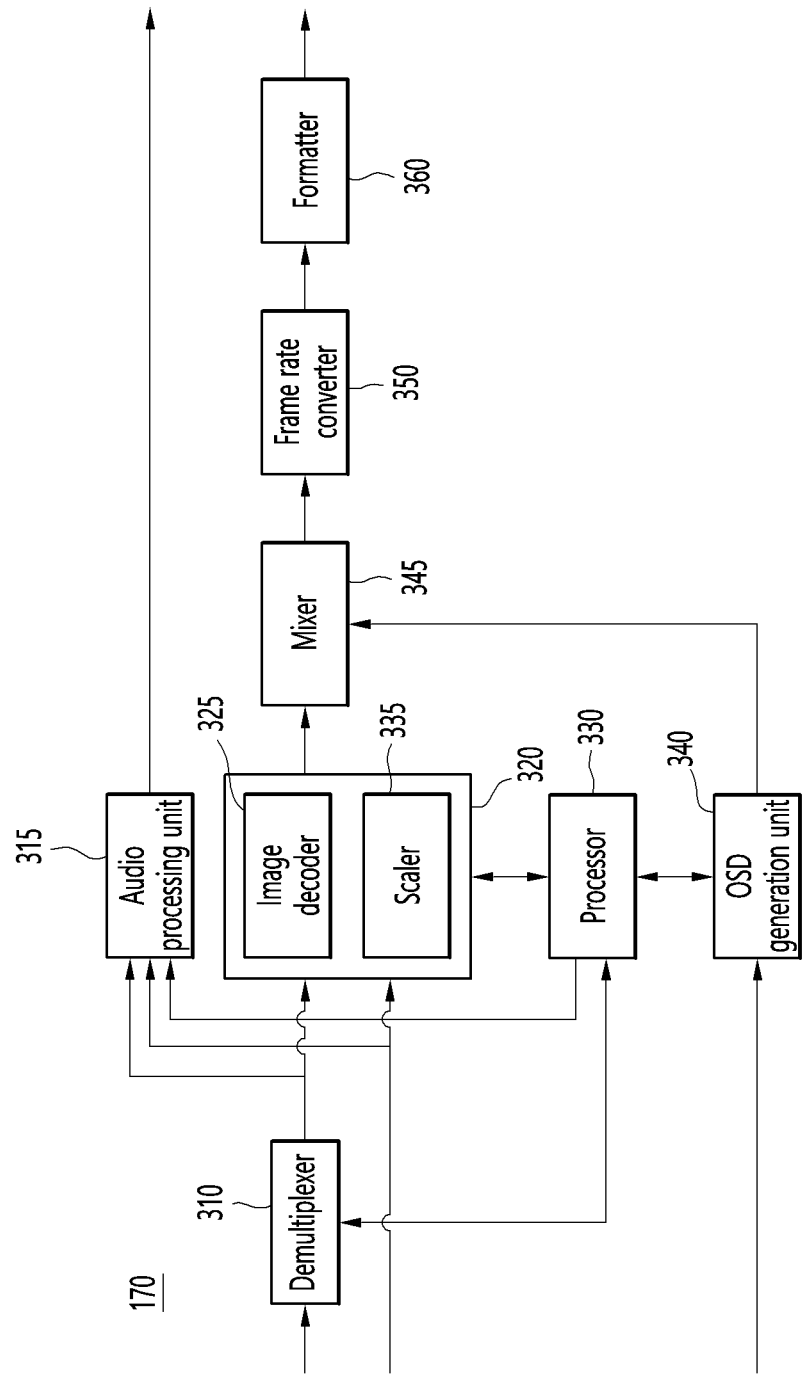
FIG. 3 is an example of an internal block diagram of a controller of FIG. 2.

FIG. 3 is an example of a block diagram of the inside of a controller in FIG. 2.

For description with reference to the drawings, the controller 170 according to an embodiment of the present invention includes a demultiplexer 310, an audio processing unit 315, an image processing unit 320, a processor 330, an OSD generation unit 340, a mixer 345, a frame rate converter 350, and a formatter 360. In addition, an audio processing unit (not illustrated) and a data processing unit (not illustrated) are further included.

The demultiplexer 310 demultiplexes a stream input. For example, in a case where an MPEG-2 TS is input, the MPEG-2 TS is demultiplexed into an image signal, an audio signal, and a data signal. At this point, a stream signal input into the demultiplexer 310 is a stream signal output from the tuner 131, the demodulator 132, or the external device interface 135.

On the other hand, the audio processing unit 315 in the controller 170 may perform audio signal processing on the audio signal demultiplexed by the demultiplexer 310 or an audio signal directly input from the network interface 133 or the external device interface 135. To this end, the audio processing unit 315 may include various decoders.

In addition, the audio processing unit 315 may include a mixer that mixes audio signals decoded by various decoders, in particular, audio signals of various channels. In addition, an audio signal acquired through mixing by the mixer may be transmitted to the audio output interface 185.

Also, the audio processing unit 315 may process a base, a treble, a volume control, or the like, or automatically process a sound field signal.

In addition, the audio processing unit 315 may adjust at least one of a gain or a phase for each frequency band of an audio signal to be output.

Meanwhile, the processed audio signal may be output through the audio output interface 185 in a sound manner. The audio output interface 185 may be implemented with a digital amplifier (D-Amp) and/or a speaker.

Alternatively, the processed audio signal may be input to an external output device, for example, an external speaker 400 through the external device interface 135, and may be output from the external speaker 400 in a sound manner.

The image processing unit 320 performs image processing of the image signal that results from the demultiplexing. To do this, the image processing unit 320 includes an image decoder 325 or a scaler 335.

The image decoder 325 decodes the image signal that results from the demultiplexing. The scaler 335 performs scaling in such a manner that a resolution of an image signal which results from the decoding is such that the image signal is possibly output to the display 180.

The image decoder 325 may include decoders of various specifications.

The processor 330 controls an overall operation within the display device 100 or within the controller 170. For example, the processor 330 controls the tuner unit 110 played in such a manner that the tuner unit 110 performs the selection of (tuning to) the RF broadcast that corresponds to the channel selected by the user or the channel already stored.

In addition, the processor 330 controls the display device 100 using the user command input through the user input interface 150, or the internal program.

In addition, the processor 330 performs control of transfer of data to and from the network interface 133 or the external device interface 135.

In addition, the processor 330 may control an overall voice recognition function and control to perform voice recognition based on an input of a voice signal.

In addition, the processor 330 controls operation of each of the demultiplexer 310, the image processing unit 320, the OSD generation unit 340, and so on within the controller 170.

The OSD generation unit 340 generates an OSD signal, according to the user input or by itself. For example, based on the user input signal, a signal is generated for displaying various pieces of information in a graphic or text format on a screen of the display 180. The OSD signal generated includes various pieces of data for a user interface screen of the display device 100, various menu screens, a widget, an icon, and so on. In addition, the OSD generated signal includes a 2D object or a 3D object.

In addition, based on a pointing signal input from the remote controller 200, the OSD generation unit 340 generates a pointer possibly displayed on the display. Particularly, the pointer is generated in a pointing signal processing unit, and an OSD generation unit 340 includes the pointing signal processing unit (not illustrated). Of course, it is also possible that instead of being providing within the OSD generation unit 340, the pointing signal processing unit (not illustrated) is provided separately.

The mixer 345 mixes the OSD signal generated in the OSD generation unit 340, and the image signal that results from the image processing and the decoding in the image processing unit 320. An image signal that results from the mixing is provided to the frame rate converter 350.

The frame rate converter (FRC) 350 converts a frame rate of an image input. On the other hand, it is also possible that the frame rate converter 350 outputs the image, as is, without separately converting the frame rate thereof.

The formatter 360 may receive signals mixed by the mixer 345, that is, an OSD signal and a decoded image signal, and may perform conversion into and output an image signal to be displayed on the display 180.

A data processing unit (not shown) in the controller 170 may perform data processing of a demultiplexed data signal. For example, when the demultiplexed data signal is an encoded data signal, the demultiplexed data signal may be decoded. The coded data signal may be EPG(electronic program guide) information including broadcast information such as a start time and an end time of a broadcast program broadcast on each channel.

On the other hand, a block diagram of the controller 170 illustrated in FIG. 3 is a block diagram for an embodiment of the present invention. Each constituent element in the block diagram is subject to integration, addition, or omission according to specifications of the image display controller 170 actually realized.

Particularly, the frame rate converter 350 and the formatter 360 may be provided separately independently of each other or may be separately provided as one module, without being provided within the controller 170.

Figure 4:
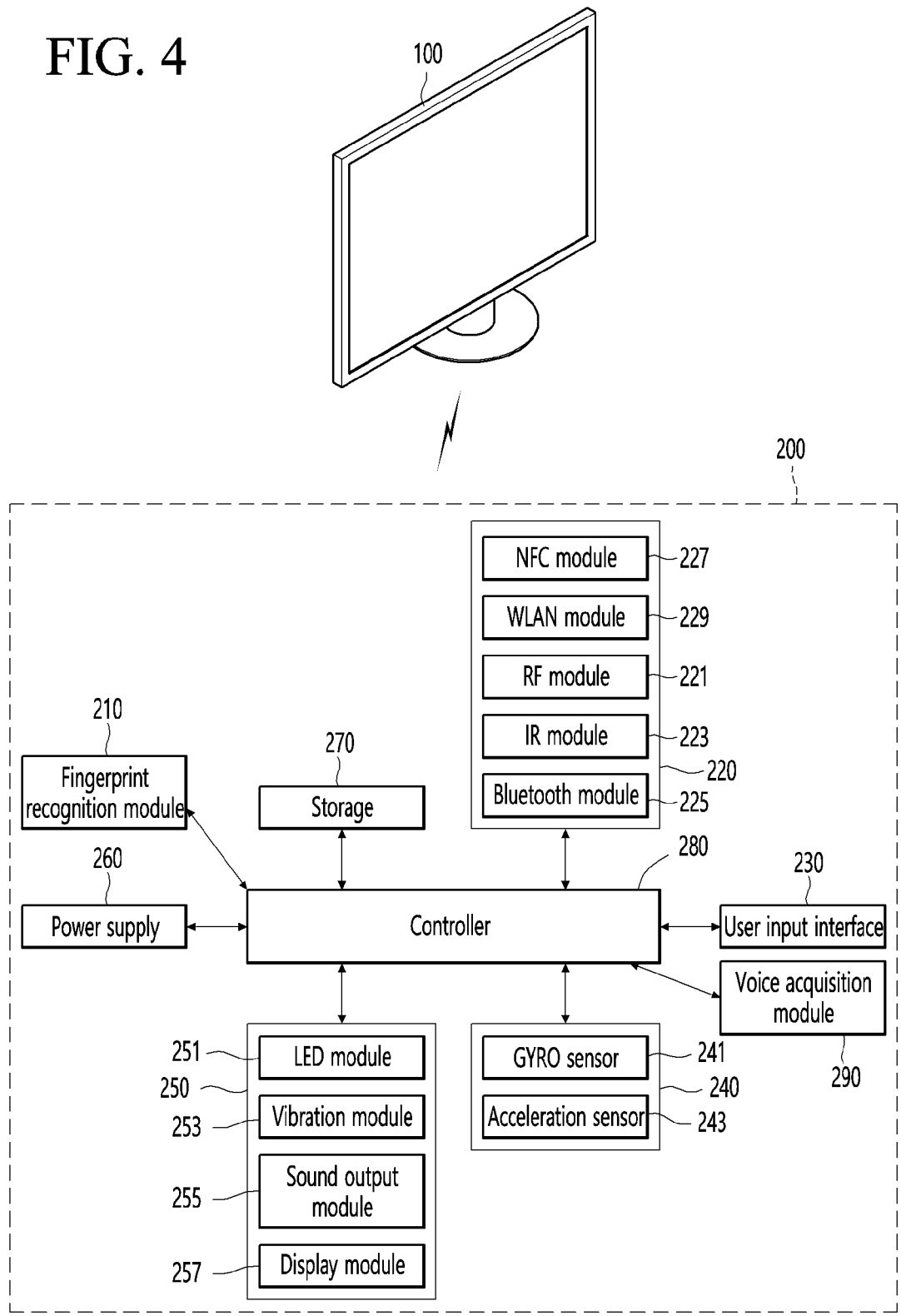
FIG. 4 is a block diagram of a remote control device according to an embodiment of the present disclosure.
Figure 5:
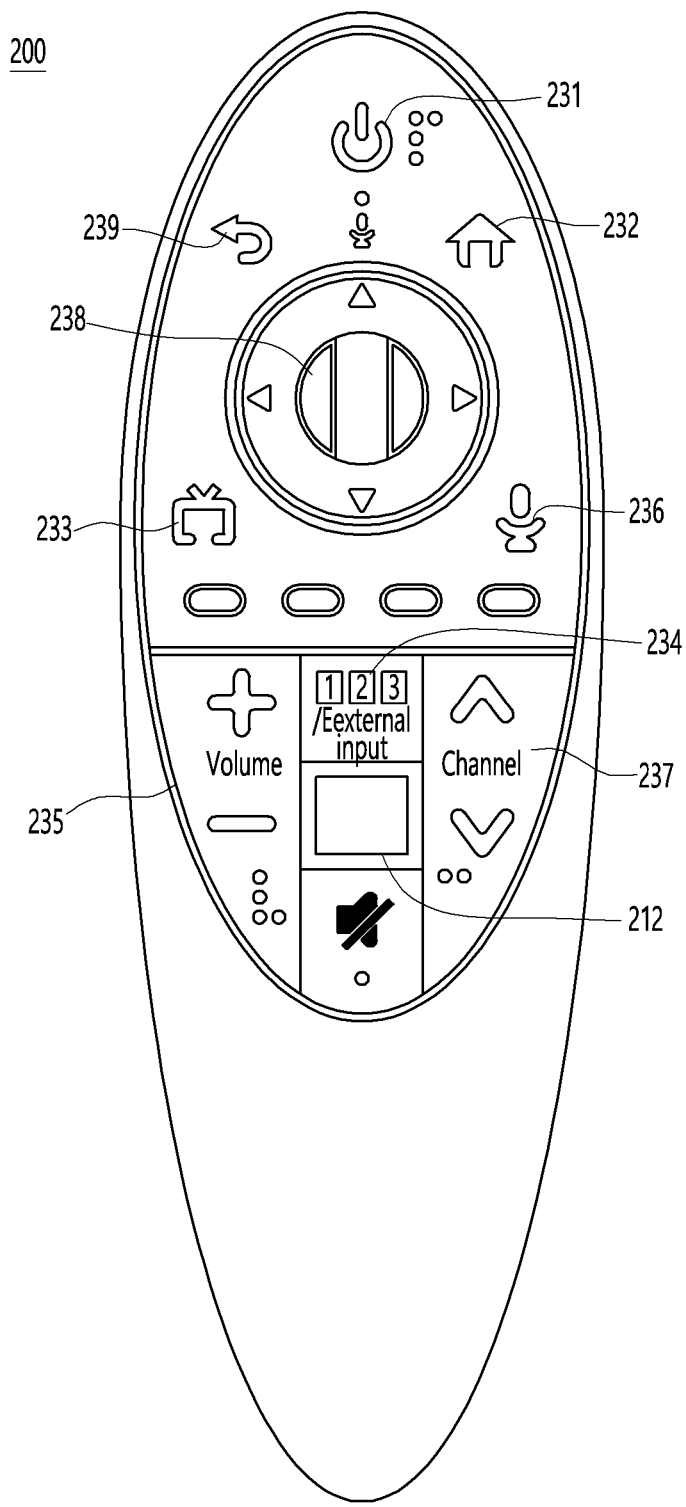
FIG. 5 shows an example of an actual configuration of a remote control device according to an embodiment of the present disclosure.

Then, referring to FIGS. 4 and 5, a remote control device is described according to an embodiment of the present disclosure.

FIG. 4 is a block diagram illustrating a remote control device according to an embodiment of the present disclosure and FIG. 5 is a view illustrating an actual configuration of a remote control device according to an embodiment of the present disclosure.

First, referring to FIG. 4, a remote control device 200 can include a fingerprint recognition module 210, a wireless communication interface 220, a user input interface 230, a sensor 240, an output interface 250, a power supply 260, a storage 270, a controller 280, and a voice acquisition module 290.

Referring to FIG. 4, the wireless communication interface 220 transmits/receives signals to/from an arbitrary any one of display devices according to the above-mentioned embodiments of the present disclosure.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards.

Additionally, the remote control device 200 can transmit signals containing information on a movement of the remote control device 200 to the display device 100 through the wireless communication interface 220.

Moreover, the remote control device 200 can receive signals transmitted from the display device 100 through the RF module 221 and if necessary, can transmit a command on power on/off, channel change, and volume change to the display device 100 through the IR module 223.

The user input interface 230 can be configured with a keypad button, a touch pad, or a touch screen. A user can manipulate the user input interface 230 to input a command relating to the display device 100 to the remote control device 200. If the user input interface 230 includes a hard key button, a user can input a command relating to the display device 100 to the remote control device 200 through the push operation of the hard key button. This will be described with reference to FIG. 5.

Referring to FIG. 5, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be button for turning on/off the power of the display device 100. The power button 231 can be button for moving to the home screen of the display device 100. The live button 233 can be a button for displaying live broadcast programs. The external input button 234 can be button for receiving an external input connected to the display device 100. The voice adjustment button 235 can be button for adjusting the size of a volume outputted from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 4 is described.

If the user input interface 230 includes a touch screen, a user can touch a soft key of the touch screen to input a command relating to the display device 100 to the remote control device 200. Additionally, the user input interface 230 can include various kinds of input means manipulated by a user, for example, a scroll key and a jog key, and this embodiment does not limit the scope of the present disclosure.

The sensor 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display 180 of the display device 100.

The output interface 250 can output image or voice signals corresponding to a manipulation of the user input interface 230 or corresponding to signals transmitted from the display device 100. A user can recognize whether the user input interface 230 is manipulated or the display device 100 is controlled through the output interface 250.

For example, the output interface 250 can include an LED module 251 for flashing, a vibration module 253 for generating vibration, a sound output module 255 for outputting sound, or a display module 257 for outputting an image, if the user input interface 230 is manipulated or signals are transmitted/received to/from the display device 100 through the wireless communication interface 220.

Additionally, the power supply 260 supplies power to the remote control device 200 and if the remote control device 200 does not move for a predetermined time, stops the power supply, so that power waste can be reduced. The power supply 260 can resume the power supply if a predetermined key provided at the remote control device 200 is manipulated.

The storage 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 can store, in the storage 270, information on a frequency band for transmitting/receiving signals to/from the display device 100 paired with the remote control device 200 and refer to it.

The controller 280 controls general matters relating to a control of the remote control device 200. The controller 280 can transmit a signal corresponding to a predetermined key manipulation of the user input interface 230 or a signal corresponding to a movement of the remote control device 200 sensed by the sensor 240 to the display device 100 through the wireless communication interface 220.

Additionally, the voice acquisition module 290 of the remote control device 200 can acquire voice.

The voice acquisition module 290 can include at least one microphone 291 and acquire voice through the microphone 291.

Figure 6:
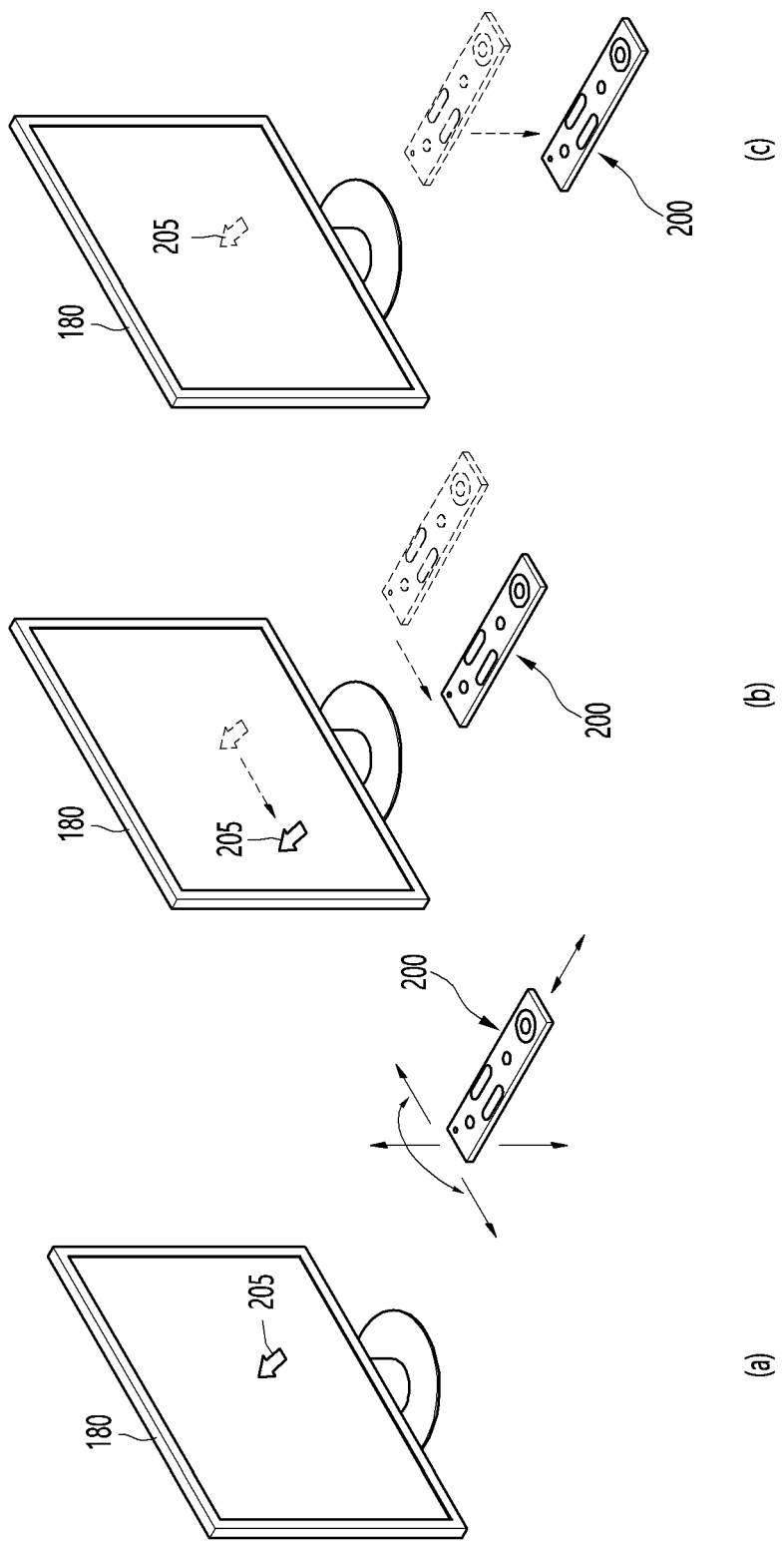
FIG. 6 shows an example of using a remote control device according to an embodiment of the present disclosure.

Then, FIG. 6 is described.

FIG. 6 is a view of utilizing a remote control device according to an embodiment of the present disclosure.

FIG. 6(a) illustrates that a pointer 205 corresponding to the remote control device 200 is displayed on the display 180.

A user can move or rotate the remote control device 200 vertically or horizontally. The pointer 205 displayed on the display 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 6(b) illustrates that if a user moves the remote control device 200, the pointer 205 displayed on the display 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 6(c) illustrates that while a specific button in the remote control device 200 is pressed, a user moves the remote control device 200 away from the display 180. Thus, a selection area in the display 180 corresponding to the pointer 205 can be zoomed in and displayed largely.

On the other hand, if a user moves the remote control device 200 close to the display 180, a selection area in the display 180 corresponding to the pointer 205 can be zoomed out and displayed reduced.

On the other hand, if the remote control device 200 is away from the display 180, a selection area can be zoomed out and if the remote control device 200 is close to the display 180, a selection area can be zoomed in.

Additionally, if a specific button in the remote control device 200 is pressed, the recognition of a vertical or horizontal movement can be excluded. That is, if the remote control device 200 is moved away from or close to the display 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display 180 and also can be displayed in correspondence to a plurality of points such as a line and a surface.

Figure 7:
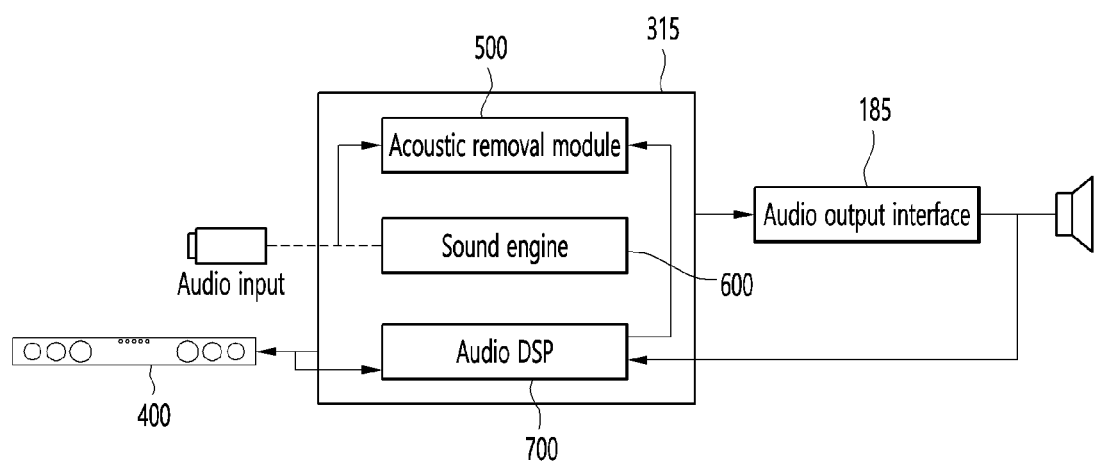
FIG. 7 is a block diagram for describing a method of removing an acoustic signal from a microphone signal in a display device according to an embodiment of the present disclosure.

FIG. 7 is a block diagram for describing a method of removing an acoustic signal from a microphone signal in a display device according to an embodiment of the present disclosure.

FIG. 7 shows an example of an internal block diagram of the audio processing unit of FIG. 3.

The audio processing unit 315 may include an acoustic removal module 500, a sound engine 600, and an audio digital signal processor (DSP) 700.

The audio processing unit 315 may process an input audio signal. The audio processing unit 315 may perform audio signal processing on the audio signal demultiplexed by the demultiplexer 310 or an audio signal input from the network interface 133 or the external device interface 135. To this end, the audio processing unit 315 may include various decoders.

The audio processing unit 315 may include a mixer that mixes audio signals decoded by various decoders, in particular, audio signals of various channels.

The audio processing unit 315 may include a sound engine 600 that performs signal processing for sound to be output, and the sound engine 600 may include the above-described decoder, mixer, and the like.

The sound engine 600 may perform signal processing on sound output from the audio output interface 185 and sound output from the external speaker 400.

The acoustic removal module 500 may filter out a predetermined component from an input audio signal, remove a predetermined acoustic signal, or adjust at least one of a gain or a phase for each frequency band of an audio signal to be output.

The audio DSP 700 may control overall operation within the audio processing unit 315. The audio DSP 700 may control the acoustic removal module 500 and the sound engine 600.

An audio signal processed by the audio processing unit 315 may be output from a built-in speaker through the audio output interface 185 in a sound manner, or may be output from the external speaker 400 in a sound manner.

The display device 100 may be connected in a wired/wireless manner through the external speaker 400 such as a sound bar and the external device interface 135 to transmit digital signals such as SPDIF and HDMI.

Since the audio signal transmitted to the external speaker 400 is different from the sound field effect in the display device 100, a transmission path for the sound engine 600 may be implemented. That is, since the audio signal transmitted to the external speaker 400 has a sound field effect different from that of an existing signal, the phase difference of the captured signal may be corrected due to the directionality according to a position when a multi-channel sound system is configured.

In addition, as shown in FIG. 7, since a path through which the signal is transmitted to the external speaker 400 does not pass through the audio output interface 185, the audio signal captured at the input terminal of the audio output interface 185 and the audio signal captured at the input terminal of the external speaker 400 may be different from each other.

Figure 8:
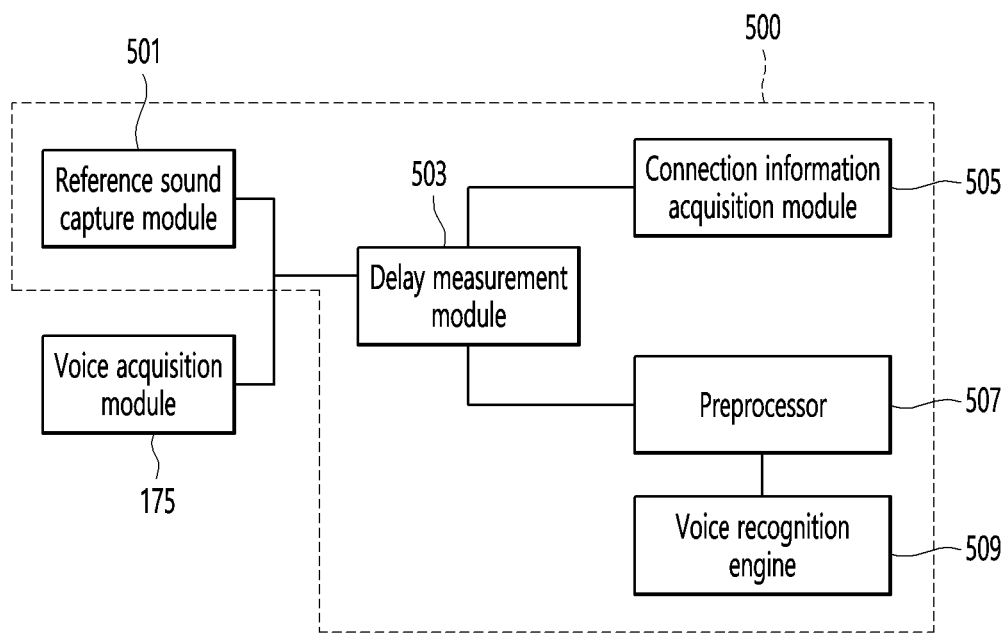
FIG. 8 is a diagram illustrating an internal block diagram of an acoustic removal module and a voice acquisition module according to an embodiment of the present disclosure.

FIG. 8 is a diagram illustrating an internal block diagram of an acoustic removal module and a voice acquisition module according to an embodiment of the present disclosure.

As shown in FIG. 8, the acoustic removal module 500 may include at least some or all of a reference sound capture module 501, a delay measurement module 503, a connection information acquisition module 505, a preprocessor 507, and a voice recognition engine 509.

As described above, the acoustic removal module 500 may filter out a predetermined component from an input audio signal, remove a predetermined acoustic signal, or adjust at least one of a gain or a phase for each frequency band of an audio signal to be output. With reference to FIG. 8, a method of removing an acoustic signal from an audio signal in the acoustic removing unit will be described in detail. In particular, the acoustic signal may include sound output from the audio output interface 185 and sound output from the external speaker 400.

The delay measurement module 503 may acquire a delay required until sound output from the external speaker 400 is input to the voice acquisition module 175.

That is, the present disclosure may increase the accuracy of voice recognition by measuring the delay before preprocessing a microphone signal.

The delay may mean a delay time required until the sound output from the external speaker 400 reaches the voice acquisition module 175. The delay may mean a time difference between a time point when sound is output from the external speaker 400 and a time point when the sound output from the external speaker 400 is received by the voice acquisition module 175. The delay may be variable depending on an installation position of the external speaker 400.

The delay measurement module 503 may acquire the delay by comparing an audio signal input to the external speaker 400 with a microphone signal input by the voice acquisition module 175 so as to be output from the external speaker 400.

Meanwhile, a delay time (referred to as "internal delay" to distinguish terms from the "delay" described above) may be caused even when the sound output from the audio output interface 185 of the display device 100 is input to the voice acquisition module 175, but the internal delay may be measured in advance when the display device 100 is manufactured and stored in the storage 140. The reason for this is that the internal delay is constant. Accordingly, in the present disclosure, a method for measuring a delay between the external speaker 400 and the voice acquisition module 175 will be described in more detail.

Hereinafter, a method for measuring the delay by the delay measurement module 503 will be described.

The delay measurement module 503 may receive signals from the reference sound capture module 501 and the voice acquisition module 175.

Specifically, the delay measurement module 503 may receive an audio signal input to the audio output interface 185 and an audio signal input to the external speaker 400 from the reference sound capture module 501. In addition, the delay measurement module 503 may receive a microphone signal received by the voice acquisition module 175.

The delay measurement module 503 may acquire a delay by comparing the audio signal input to the external speaker 400 with the microphone signal. The delay measurement module 503 may acquire the delay by applying the audio signal input to the external speaker 400 and the microphone signal to a cross correlation function. The delay may be calculated in terms of time or the number of samples.

As described above, the internal delay may be stored in the storage 140, or the delay measurement module 503 may acquire the internal delay by comparing the audio signal input to the audio output interface 185 with the microphone signal.

Meanwhile, the microphone signal described above may mean an audio signal received by a microphone (not shown) provided in the display device 100.

The microphone signal may include an acoustic signal and a voice signal. The acoustic signal may include sound output from at least one of the audio output interface 185 and the external speaker 400, and the voice signal may include a voice command uttered by a user.

The reference sound capture module 501 may acquire the audio signal input to the audio output interface 185 and the audio signal input to the external speaker 400.

The delay measurement module 503 may calculate a delay by comparing the microphone signal with the audio signal input to the external speaker 400.

The delay measurement module 503 may transmit the audio signals received from the reference sound capture module 501 and the microphone signal received from the external speaker 400 to the preprocessor 507.

Further, the delay measurement module 503 may transmit the acquired delay to the preprocessor 507.

The preprocessor 507 may acquire a voice signal by removing the acoustic signal from the microphone signal.

The preprocessor 507 may transmit the voice signal to the voice recognition engine 509.

The voice recognition engine 509 may extract features of the voice signal in a vector form, and output a voice recognition result by using a voice database including phonetic information such as the extracted feature vector, an acoustic model, a language model, and a pronunciation dictionary. However, this is merely exemplary, and the voice recognition engine 509 may analyze a voice signal in various ways and output a voice recognition result.

The connection information acquisition module 505 may acquire connection information with the external speaker 400. The connection information acquisition module 505 may acquire whether or not delay re-measurement is required based on connection information with the external speaker 400.

After the external speaker 400 is initially connected to the display device 100, the connection to the display device 100 may be turned on/off as the power of the display device 100 is turned on/off. In addition, after the external speaker 400 is first connected to the display device 100, the connection with the display device 100 may be turned on/off according to switching of the external input of the display device 100.

Accordingly, the connection information acquisition module 505 may acquire whether the external speaker 400 is first connected or reconnected to the display device 100.

For example, the connection information acquisition module 505 may detect whether the external speaker 400 and the display device 100 are connected, and re-measures the delay when the connection with the external speaker 400 is switched to the connected state This can be recognized as a necessary point.

The controller 170 may acquire a connection time point with the external speaker 400, a power on/off point, a channel change point, and an external input switching point as a delay re-measurement point. In this case, the delay measurement module 503 may be re-measured.

Figure 9:
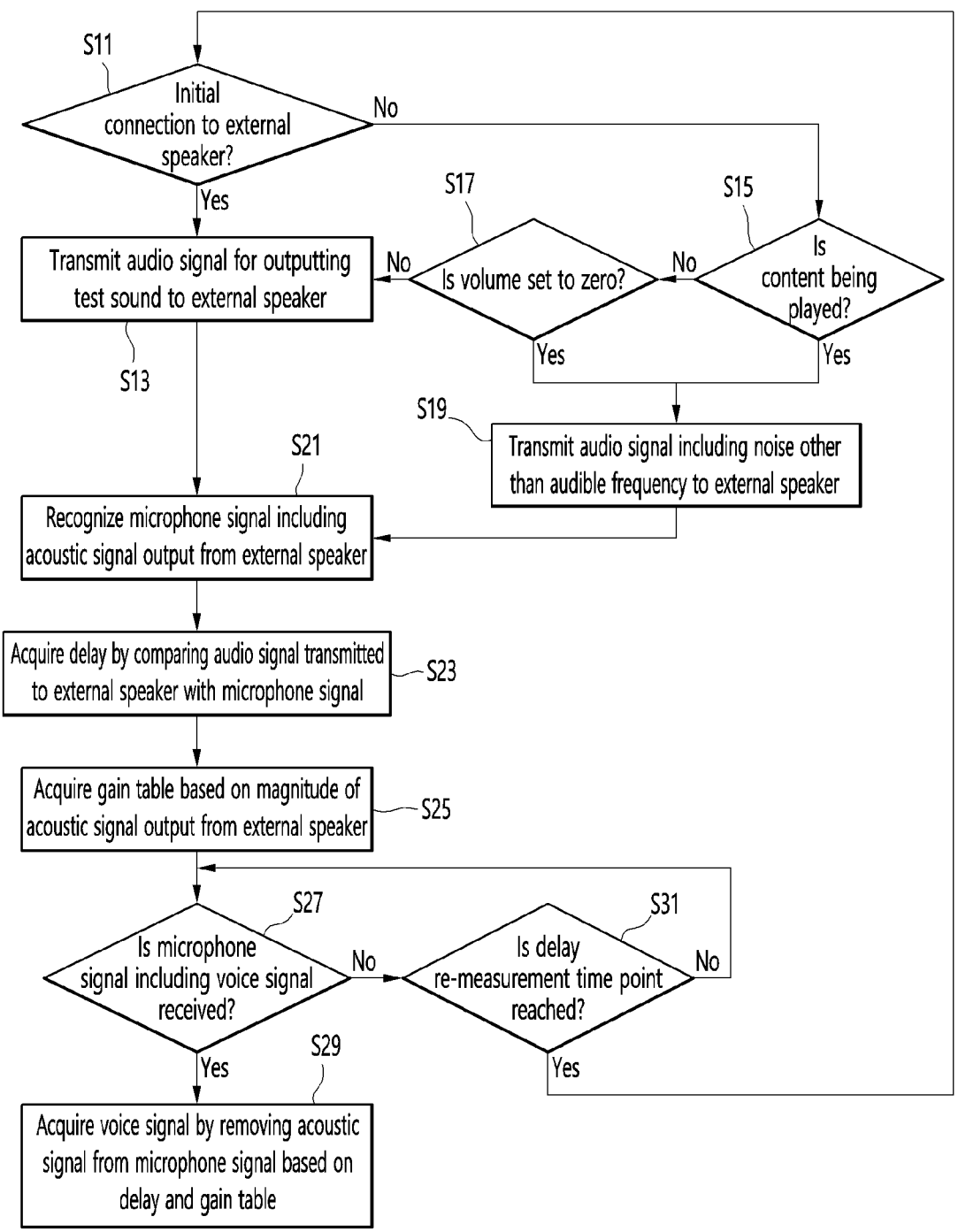
FIG. 9 is a flowchart of a method of operating a display device according to an embodiment of the present disclosure.

FIG. 9 is a flowchart of a method of operating a display device according to an embodiment of the present disclosure.

The controller 170 may acquire whether the external speaker 400 is initially connected to the display device (S11).

The controller 170 may detect whether the external speaker 400 is connected to the display device. When the external speaker 400 is connected, the controller 170 may determine whether the external speaker 400 is a device that is initially connected to the display device 100. Specifically, the controller 170 may acquire whether the external speaker 400 is connected through the connection information acquisition module 505, and then determine whether the external speaker 400 is initially connected when determining that the external speaker 400 is connected.

When the external speaker 400 is initially connected, the controller 170 may transmit an audio signal for outputting a test sound to the external speaker 400 (S13).

Here, the test sound may mean a sound output from the external speaker 400 in order to measure a delay until the sound output from the external speaker 400 is input to the voice acquisition module 175. In this case, the test sound may include a noise belonging to an audible frequency or a noise other than the audible frequency. When the external speaker 400 is installed, the external speaker 400 is generally first connected to the display device 100, and there is a high probability that the user is not watching content in the state in which the external speaker 400 is being installed, so that the noise belonging to the audible frequency may be output as a test sound.

That is, the test sound may include only the noise other than the audible frequency, or may include the noise belonging to the audible frequency.

When the test sound includes the noise belonging to the audible frequency, the volume may be set to a value optimized for delay measurement (e.g., 30). Further, there may be various types of test sound.

When the test sound includes noise belonging to the audible frequency, the user may recognize that a delay is being measured through the test sound, and accordingly, the user may minimize the ambient noise, thus improving the accuracy of the delay measurement.

Meanwhile, the controller 170 may determine whether content is being played or whether the volume is set to zero unless the external speaker 400 is initially connected.

In FIG. 9, it is illustrated that the controller 170 first determines whether content is being played, and when the content is not being played, determines whether the volume is set to zero, but this is only exemplary. That is, the controller 170 may first determine whether the volume is set to zero, and then determine whether the content is being played.

Hereinafter, according to the example of FIG. 9, it will be described that the controller 170 first determines whether content is being played.

The controller 170 may determine whether the content is being played (S15).

That is, the controller 170 may determine whether the external speaker 400 is currently reproducing content when the external speaker 400 is not initially connected. For example, when a terrestrial broadcast image, a cable broadcast image, or an image received through the external device interface 135 is being displayed on the display 180, the controller 170 may determine that the content is currently played.

When the content is being played, the controller 170 may transmit an audio signal including noise other than the audible frequency to the external speaker 400 (S19).

When the content is being played, the controller 170 may transmit an audio signal acquired by mixing a sound of the content and the noise other than the audible frequency to the external speaker 400. In this case, in step S23 to be described later, the controller 170 may acquire a delay by extracting noise other than an audible frequency from the microphone signal through a band pass filter. A detailed description will be given in detail with reference to step S23.

Meanwhile, when the content is not being played, the controller 170 may determine whether the volume is set to zero (S17).

Likewise, when the volume is set to zero, the controller 170 may transmit an audio signal including noise other than the audible frequency to the external speaker 400 (S19).

That is, the controller 170 may transmit an audio signal including the noise other than the audible frequency to the external speaker 400 when content is being played or when the volume is set to zero.

The controller 170 may control the noise other than the audible frequency to be output from the external speaker 400 and acquire a delay by recognizing the noise other than the audible frequency from the microphone signal.

In a state in which the content is being played, since the user's viewing of the content is disturbed when other sound is output for delay measurement, an audio signal including the noise other than the audible frequency may be transmitted to the external speaker 400. Likewise, since the volume is set to zero when the user does not want sound output, an audio signal including noise other than an audible frequency may be transmitted to the external speaker 400. That is, when the external speaker 400 is reconnected, the controller 170 may transmit an audio signal including noise other than the audible frequency to the external speaker 400 in order to minimize user discomfort when measuring the delay.

That is, the controller 170 may acquire the delay by removing noise other than the audible frequency.

Figures 10, 11:
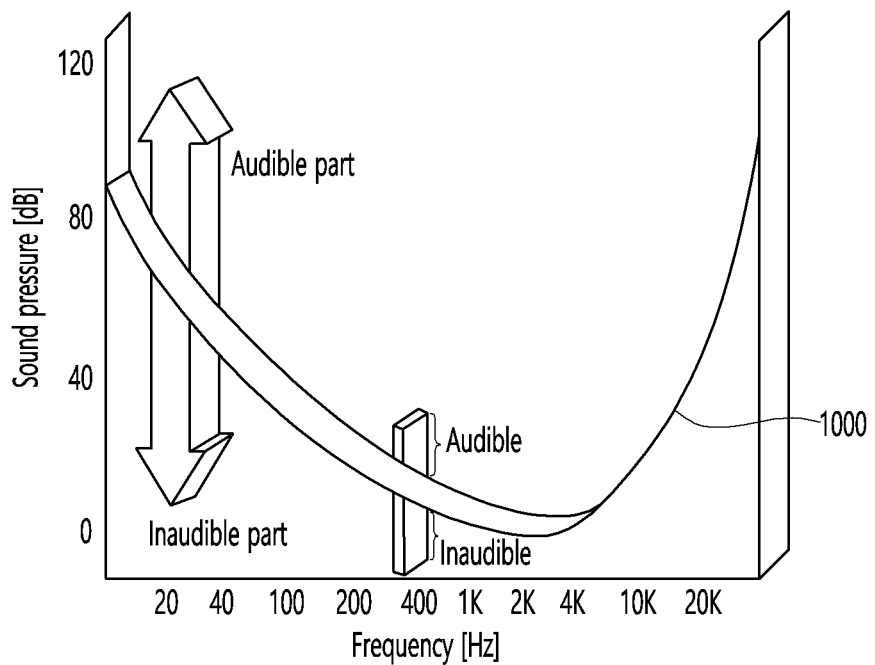
FIG. 10 is a graph showing an audible frequency band for describing noise other than the audible frequency according to an embodiment of the present disclosure.
FIG. 11 is an example of a gain table according to an embodiment of the present disclosure.

FIG. 10 is a graph showing an audible frequency band for describing noise other than the audible frequency according to an embodiment of the present disclosure.

Referring to FIG. 10, the audible frequency band is 20 to 20 k [Hz], but the audible frequency band may be divided into a part that is heard by a human being and a part that is not heard by a human being according to a sound pressure even when it belongs to the audible frequency band. Audible limit graph 1000 illustrated in FIG. 10 may be a graph for dividing a part that is heard by a human being and a part that is not heard by a human being in the audible frequency band. For example, in a case where the frequency is 20 [Hz], a human being can hear sound only when the sound pressure exceeds about 70 [dB]. In a case where the frequency is 400 [Hz], a human being can hear sound only when the sound pressure exceeds about 10 [dB].

Accordingly, when transmitting an audio signal including noise other than the audible frequency, the controller 170 may include a noise having a waveform similar to that of the audible limit graph 100 as noise other than the audible frequency. In this case, a band pass filter to be described later may extract only a signal having a waveform similar to that of the audible limit graph 100.

The description will be given again with reference to 9.

The controller 170 may transmit an audio signal for outputting a test sound to the external speaker 400 unless the content is being played or the volume is set to zero.

After transmitting the audio signal to the external speaker 400 in step S13 or step S19, the controller 170 may recognize a microphone signal including an acoustic signal output from the external speaker 400 (S21).

After transmitting the audio signal to the external speaker 400, the controller 170 may control the voice acquisition module 175 so as to receive the microphone signal.

When the user is speaking a specific voice command, the microphone signal may include a voice signal and an acoustic signal. Meanwhile, when the user is not speaking a specific voice command, the microphone signal may include only an acoustic signal.

The controller 170 may acquire a delay by comparing the audio signal transmitted to the external speaker 400 with the microphone signal (S23).

The controller 170 may acquire the audio signal transmitted to the external speaker 400 by controlling the reference sound capture module 501 so as to capture the audio signal input to the external speaker 400.

The controller 170 may calculate the delay by applying the audio signal transmitted to the external speaker 400 and the microphone signal acquired by the voice acquisition module 175 to a cross correlation function. That is, the controller 170 may perform a multiplication operation with one of the audio signal and the microphone signal and while delaying the other by a reference unit, and calculate the maximum output value of the multiplication operation result as the delay.

On the other hand, when the controller 170 transmits an audio signal including noise other than the audible frequency to the external speaker 400, the controller 170 may calculate the delay by applying a signal acquired by extracting only the noise other than the audible frequency from the microphone signal by using a band pass filer and the audio signal to the cross-correlation function.

In this case, the band pass filter may be a target band pass filter for extracting only noise other than the audible frequency, and the target band pass filter may filter only noise having a certain frequency band and a sound pressure corresponding to each frequency.

When the delay is acquired, the controller 170 may acquire a voice signal by removing the acoustic signal from the microphone signal based on the acquired delay. Accordingly, when the delay is acquired, the controller 170 does not need to measure the delay until the delay re-measurement time point is reached, and thus may transmit an audio signal for outputting only the sound of content to the external speaker 400. That is, when the delay is acquired, the controller 170 may transmit an audio signal for outputting only the sound of the content to the external speaker 400 without mixing noise other than the audible frequency with the sound of the content.

On the other hand, when the magnitude of the sound output from the external speaker 400 and input to the voice acquisition module 175 is not accurately known, a problem in which the acoustic signal remains even through the acoustic signal is removed from the microphone signal may occur. However, since the output magnitudes are different for external speakers 400 even when the set volumes are the same, it is difficult to accurately know the magnitude of the sound. Hereinafter, a method for acquiring the magnitude of the sound output from the external speaker 400 and input to the voice acquisition module 175 will be described.

The controller 170 may acquire a gain table based on the magnitude of the acoustic signal output from the external speaker 400 (S25).

The gain table is to minimize a problem that the accuracy of voice recognition is deteriorated due to a varying output sound for each external speaker, and may be a table in which a magnitude of the microphone signal from the audio output interface 185 and input to the voice acquisition module is mapped to a magnitude of the microphone signal from the external speaker 400 and input to the voice acquisition module for each volume level.

The controller 170 may acquire the gain table corresponding to the connected external speaker 400 and store the gain table in the storage 140. When storing the gain table, the storage 140 may map and store a first magnitude and a second magnitude for each volume level, as illustrated in FIG. 11 to be described later.

FIG. 11 is an example of a gain table according to an embodiment of the present disclosure.

The gain table may be a table in which a volume level 801, a magnitude of the reference signal 810, a first magnitude 820 of a microphone signal input to the voice acquisition module 175 when the reference signal is output only from the audio output interface 185, and a second magnitudes 830 of the microphone signal input to the voice acquisition module 175 when the reference signal is output in a state in which the external speaker 400 is connected are mapped to one another.

The volume level 801 includes volume levels settable in the display device 100. According to the example of FIG. 11, the volume level 801 may be 10, 20, 30, or the like, but is only exemplary. As another example, the volume level 801 may be any one of 0 to 100.

The magnitude of the reference signal 810 may mean a magnitude of the reference audio signal transmitted to the audio output interface 185 or the external speaker 400.

The first magnitude 820 may mean the magnitude of a microphone signal input to the voice acquisition module 175 when the reference audio signal is output only from the audio output interface 186. The first magnitude 820 may be a magnitude of a microphone signal when a sound output from the audio output interface 185 is input to the voice acquisition module 175 at a mapped volume level.

The second magnitude 830 may mean the magnitude of a microphone signal input to the voice acquisition module 175 when the reference audio signal is output in a state in which the external speaker 400 is connected. The second magnitude 830 may be a magnitude of a microphone signal when a sound output while the external speaker 400 is connected is input to the voice acquisition module 175 at a mapped volume level.

Referring to the example of FIG. 11, the gain table may include first data indicating that the amplitude of the microphone signal received by the voice acquisition module 175 is −30 dB when the audio output interface 185 outputs a reference audio signal of −7 dB, and the magnitude of the microphone signal received by the voice acquisition module 175 is −26 dB when a reference audio signal of −7 dB is output while the external speaker 400 is connected in a case where the volume is set to 10 in the gain table, second data indicating that the amplitude of the microphone signal received by the voice acquisition module 175 is −32 dB when the audio output interface 185 outputs a reference audio signal of −14 dB, and the magnitude of the microphone signal received by the voice acquisition module 175 is −28 dB when a reference audio signal of −14 dB is output while the external speaker 400 is connected in a case where the volume is set to 20 in the gain table, fourth data indicating that the amplitude of the microphone signal received by the voice acquisition module 175 is −40 dB when the audio output interface 185 outputs a reference audio signal of −33 dB, and the magnitude of the microphone signal received by the voice acquisition module 175 is −38 dB when a reference audio signal of −33 dB is output while the external speaker 400 is connected in a case where the volume is set to 20 in the gain table, and the like.

The controller 170 may store the magnitude 810 of the reference signal and the first magnitude 820 for each volume level 801, in advance. Since the volume level 801, the reference signal size 810, the magnitude 820 of the reference signal, and the first magnitude 820 are fixed values, they may be measured in advance and stored in the storage 140 when the display device 100 is manufactured.

When the external speaker 400 is connected, the controller 170 may measure the second magnitude 830 based on the acoustic signal output from the external speaker 400, and acquire the gain table by mapping the measured second magnitude 830 to the volume magnitude 801, the magnitude 180 of the reference signal and the first magnitude 820.

The controller 170 has the advantage of improving the accuracy of voice recognition by removing the acoustic signal from the microphone signal regardless of the output magnitudes different for external speakers 400 by using the gain table.

The description will be given again with reference to 9.

The controller 170 may acquire whether a microphone signal including a voice signal is received (S27).

The controller 170 may determine whether the user is speaking a voice command. For example, the user may utter a voice command including a keyword such as "Hi, LG", and the controller 170 may determine whether the user is speaking the voice command through keyword recognition. When the user utters a voice command, the controller 170 may receive a microphone signal including a voice signal.

Meanwhile, according to an embodiment, the controller 170 may receive a microphone signal regardless of a keyword, and the microphone signal may include the voice signal.

When receiving the microphone signal including the voice signal, the controller 170 may acquire the voice signal by removing the acoustic signal from the microphone signal based on a delay and gain table (S29).

The controller 170 may acquire the voice signal by removing the acoustic signal output from at least one of the audio output interface 185 or the external speaker 400 from the microphone signal received by the voice acquisition module 175.

Before removing the acoustic signal from the microphone signal, the controller 170 may perform correction based on the difference between the first magnitude and the second magnitude of the microphone signal.

The controller 170 may acquire the voice signal by removing both a first acoustic signal output from the audio output interface 185 and a second acoustic signal output from the external speaker 400 from the corrected microphone signal.

The controller 170 may correct the microphone signal by the difference between the first magnitude and the second magnitude acquired from the gain table, and then remove an audio signal inputted to the audio output interface 185 and the audio signal inputted to the external speaker 400, the audio signals being acquired by the reference sound capture module 501 based on the internal delay and the delay to acquire the voice signal.

On the other hand, when the microphone signal including the voice signal is not received, the controller 170 may determine whether the delay re-measurement time point is reached (S31).

The controller 170 may set a delay re-measurement time point in advance. For example, at least one of a time point of connection detection of the external speaker 400, a power on/off time point of the display device 100, a channel switching time point, and an external input switching time point may be set as a delay re-measurement time point.

The reason for this is that the delay may be minutely changed whenever the external speaker 400 is (re)connected or the external speaker 400 is initialized. In addition, when the channel is switched or the external input is switched, the input image and sound quality vary. Likewise, the buffering in the external speaker 400 may be changed according to the input image and sound quality, and accordingly, the delay may vary. Accordingly, the controller 170 may re-measure the delay at each delay re-measurement time point, and in this case, since the acoustic signal is more accurately removed from the microphone signal, improving the accuracy of voice recognition.

If it does not correspond to the delay re-measurement time, the controller 170 may continuously obtain whether to receive a microphone signal including a voice signal, and perform Acoustic Echo Cancellation (AEC) to remove the acoustic signal from the microphone signal when receiving the microphone signal.

After the delay is acquired, the controller 170 may transmit an audio signal for outputting only the sound of the content to the external speaker 400 without mixing noise other than the audible frequency.

However, when it is determined that the delay re-measurement time point is reached, the controller 170 may acquire the delay by performing the above-described operations again.

In this way, the controller 170 may determine a time point when the delay re-measurement is required, thereby reducing unnecessary delay measurements and minimizing the number of delay measurements.

According to an embodiment of the present disclosure, when the external speaker 400 is connected, the display device 100 measures and corrects the delay according to the installation position of the external speaker 400, so that even when receiving a voice command from a remote user, the display device recognizes voice commands more accurately.

The above description is merely illustrative of the technical idea of the present disclosure, and various modifications and changes may be made thereto by those skilled in the art without departing from the essential characteristics of the present disclosure.

Therefore, the embodiments of the present disclosure are not intended to limit the technical spirit of the present disclosure but to illustrate the technical idea of the present disclosure, and the technical spirit of the present disclosure is not limited by these embodiments.

The scope of protection of the present disclosure should be interpreted by the appending claims, and all technical ideas within the scope of equivalents should be construed as falling within the scope of the present disclosure.

The invention claimed is:

1. A display device comprising:
an external device interface configured to connect the display device to an external speaker;
a microphone configured to receive a microphone signal; and
a controller configured to:
transmit an inaudible test signal to the external speaker to measure a signal delay between the external speaker and the display device, and
extract a voice signal by removing an acoustic signal output from the external speaker from the microphone signal based on the measured signal delay,
wherein the controller is further configured to:
in response to the external speaker not being initially connected to the display device, determine if a volume of the display device is set to zero,
in response to the volume of the display device being set to zero, transmit the inaudible test signal to the external speaker, and
in response to the volume of the display device not being set to zero, transmit the audible test signal to the external speaker.

2. The display device of claim 1, wherein the controller is further configured to:
if the external speaker is initially connected to the display device, transmit an audible test signal to the external speaker to measure the signal delay between the external speaker and the display device, and
if the external speaker is not initially connected to the display device, transmit the inaudible test signal to the external speaker to measure the signal delay between the external speaker and the display device.

3. The display device of claim 1, wherein the controller is further configured to:
measure the signal delay by recognizing sound based on the inaudible test signal from the microphone signal.

4. The display device of claim 1, wherein the controller is further configured to:
in response to the external speaker not being initially connected to the display device, determine if content is being played on the display device,
in response to the content being played on the display device, transmit the inaudible test signal to the external speaker, and
in response to the content not being played the display device and the volume not being set to zero, transmit the audible test signal to the external speaker.

5. The display device of claim 4, wherein the controller is further configured to:
mix a sound of the content being played with the inaudible test signal, and
extract the inaudible test signal from the microphone signal using a band pass filter.

6. The display device of claim 5, wherein the controller is further configured to:
measure the signal delay by applying the extracted inaudible test signal and the mixed sound to a cross correlation function.

7. The display device of claim 4, wherein the controller is further configured to:
output the sound of the content alone to the external speaker when measuring the signal delay.

8. The display device of claim 1, wherein the controller is further configured to:
measure the signal delay at a time point of determining if the external speaker is initially connected to the display device, a power on/off time point, a channel change time point, and an external input switch time point.

9. The display device of claim 8, wherein the controller is further configured to:
measure the signal delay by using the audible test signal at a time point when the external speaker is first connected to the display device.

10. The display device of claim 1, further comprising:
an audio output interface configured to output sound,
wherein the controller is further configured to:
acquire the voice signal by removing an acoustic signal output from at least one of the audio output interface or the external speaker from the microphone signal.

11. The display device of claim 10, wherein the controller includes:
a reference sound capture module configured to acquire audio signals to be respectively, output from the external speaker and the audio output interface;
a delay measurement module configured to calculate the signal delay by comparing the microphone signal with an audio signal input to the external speaker;
a preprocessor configured to acquire the voice signal by removing the audio signal from the microphone signal based on the signal delay; and
a voice recognition engine configured to acquire the voice signal.

12. The display device of claim 11, wherein the audio signal includes the inaudible test signal.

13. The display device of claim 1, further comprising:
an audio output interface configured to output a sound; and
a memory configured to store a gain table including a volume level, a first magnitude of the microphone signal when a sound output from the audio output interface is input to the microphone at the volume level, and a second magnitude of the microphone signal when a sound output at the volume level in which the external speaker is connected to the display device is input to the microphone.

14. The display device of claim 13, wherein the controller is further configured to:
correct the microphone signal based on a difference between the first magnitude and the second magnitude before removing the acoustic signal from the microphone signal.

15. The display device of claim 13, wherein the memory is further configured to:
map and store the first magnitude and the second magnitude for each volume level.

16. The display device of claim 1, further comprising:
a remote controller configured to receive an input voice command and transmit the input voice command as the microphone signal to the display device.

17. The display device of claim 1, wherein the audible test signal includes a frequency range and a first sound pressure range, and
wherein the inaudible test signal includes the frequency range and a second sound pressure range different than the first pressure range making the test signal inaudible.

* * * * *